United States Patent Office 2,973,819  
Patented Mar. 7, 1961

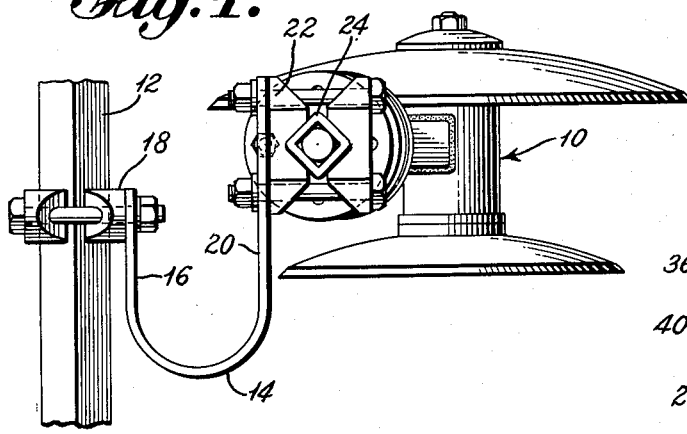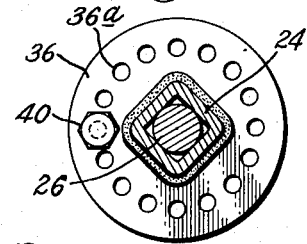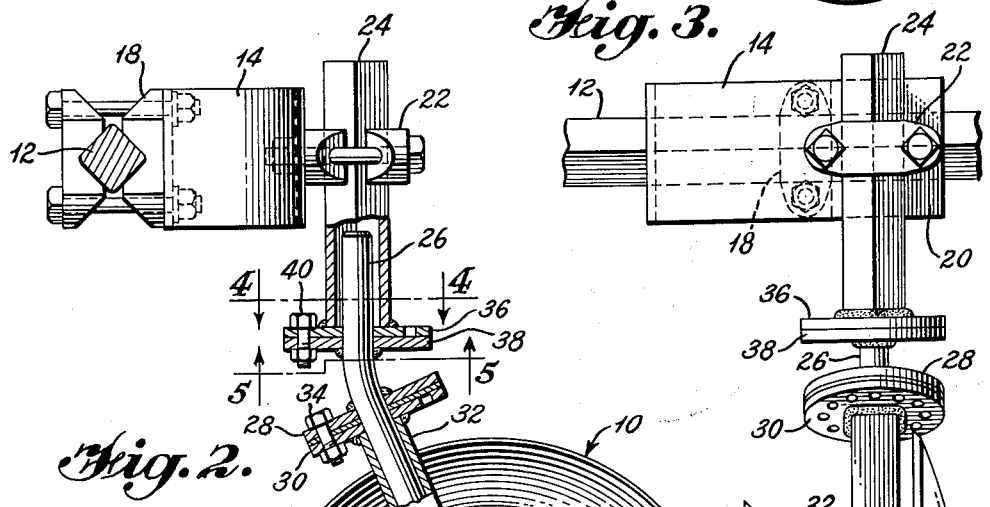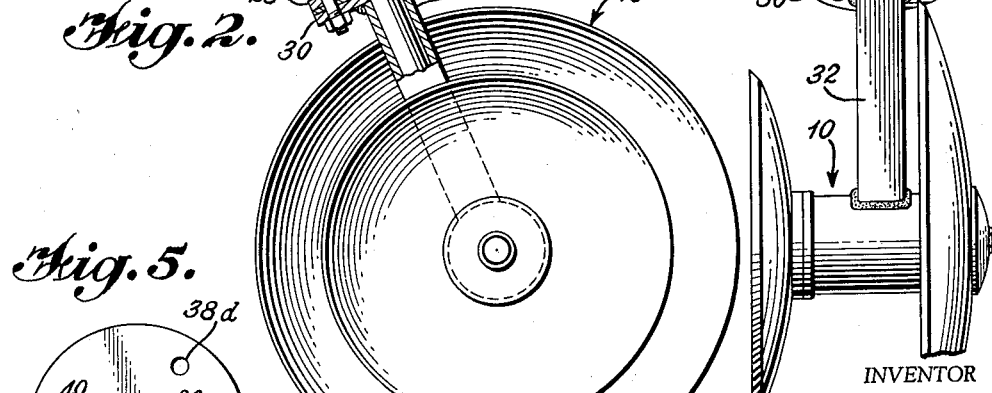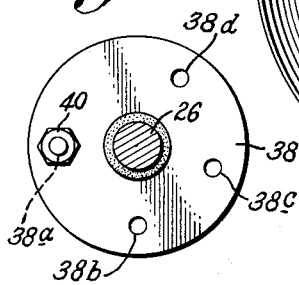

2,973,819

MOUNTING AND ADJUSTMENT MEANS FOR GROUND WORKING IMPLEMENTS

William E. Simmons, P.O. Box 149, Palatka, Fla.

Filed June 13, 1958, Ser. No. 741,821

2 Claims. (Cl. 172—600)

This invention relates to an improved mounting and adjustment means for ground working implements.

In certain sections of the country the ground or earth which must be cultivated for agricultural purposes contains numerous impediments, such as stumps, large stones and the like, which when encountered by a ground working implement will damage, break or otherwise adversely affect the implement. Accordingly, it is an object of this invention to provide an improved resilient mounting means for a ground working implement which will give when the implement encounters an obstacle to allow the implement to ride up and over the obstacle.

Another object of this invention is to provide an improved adjustable mounting means for ground working implements. In my prior Patent No. 2,790,367, I teach the use of index plates for providing an adjustable mounting for the angle of cut of a cultivator disk gang assembly. This adjustment adjusts the angular position of the cultivator disk relative to the ground and clamping means are provided for adjutsing the vertical axis of a disk carrying spindle relative to the movement of a tractor. These two independent adjustment means produce finer and more efficient results in the use of the implement. This invention provides an improved mounting means for adjusting the vertical axis of the spindle by attaching it to a tool bar and utilizing index plates for adjustably positioning the axis of the spindle with respect to the movement of the vehicle.

With these and other objects in view, the invention contemplates mounting a ground working implement, which is shown as a cultivator disk gang although it could be a single disk plow or other implement, adjustably mounted on the lower end of a bent spindle and providing index plate or flange adjustment means for adjustably positioning the vertical axis of the spindle with respect to a tractor mounted tool bar. The tool bar is connected to the spindle mounting through the intermediary of a horizontal U-shaped spring for allowing the ground working implements to ride up and over any obstacle encountered in the ground.

Other objects and advantages of this invention will be pointed out and will be apparent from the following detailed description taken in connection with the accompanying drawings, which disclose, by way of example, the principle of this invention and the best mode which has been contemplated of applying that principle.

In the drawings:

Fig. 1 is a top view of the apparatus of this invention;

Fig. 2 is a side elevation view partially in section for the sake of clarity;

Fig. 3 is an end elevation view;

Fig. 4 is a sectional view taken along line 4—4 of Fig. 2; and

Fig. 5 is a sectional view taken along line 5—5 of Fig. 2.

Referring to the drawing, reference numeral 10 indicates a cultivator disk gang assembly substantially similar to that shown in my previous Patent 2,790,367. This disk gang assembly is attached to a horizontally disposed tool crossbar 12 of the type usually carried at the rear of a tractor (not shown). The mounting and adjusting means for securing the cultivator disk gang assembly 10 to the tool crossbar 12 forms the subject of this invention.

A horizontally disposed U-shaped spring 14, preferably of spring steel approximately ⅞″ thick and 5″ wide has a short leg 16 thereof attached to the tool crossbar 12 by a suitable clamp 18. A long leg 20 of the U-shaped spring 14 is secured by means of a clamp 22 to a tubular housing 24 which is square in cross section. The tubular housing 24 is rigidly connected with the cultivator disk gang assembly 10 by a construction to be described hereinafter. Therefore, when the device is in operation and the cultivator disks of the disk gang assembly 10 encounter an obstruction in their path the spring 14 will flex and allow the disk assembly 10 to ride up and over the obstacle or obstruction. This will save the disk blades from damage or breakage.

The cultivator disk gang assembly 10, as described in my prior Patent 2,790,367, includes a bent spindle 26 having a flange 28 secured thereto by welding or the like. Flange 28 abuts a mating flange 30 which is turn is welded to a tubular housing 32. The flanges 28 and 30 are secured together in the desired adjusted relationship by means of a locking bolt 34. The foregoing construction is described in detail in the aforesaid patent.

The upper end of the bent spindle 26 is vertical with respect to the ground and rotatable adjustment of spindle 26 about its vertical axis will define the angle which the cultivator disk gang assembly will be disposed with respect to the movement of the tool bar 12 and the tractor. This invention also provides for adjusting the cultivator disk gang 10 by an improved means angularly positioning the upper end of bent spindle 26 about its vertical axis. The means for accomplishing this adjustment include an index flange 36 which is welded or otherwise secured to tubular housing 24 and a mating index flange 38 which is welded to the bent spindle 26, as shown in Figs. 2 and 3. As will be described in more detail hereinafter, a lock bolt 40 may be passed through matched index holes in the flanges to lock the spindle 26 in its adujsted position.

In order to provide the angular adjustment of the flanges relative to one another, flange 38 is provided with four holes therein, all positioned at equal radial distances from the center of the plate but circumferentially spaced at unequal arcuate distances as shown in Fig. 5. Thus, for example with 9/16″ diameter holes, the first hole is positioned as indicated at 38a, the next hole 38b is 90° away from 38a, the next hole 38c is ½″ less distant from hole 38b than the distance between holes 38a and 38b and the last hole 38d is ¼″ less distant from hole 38c than the distance between holes 38b and 38c.

The flange 36 secured to tubular housing 24 is shown in Fig. 4 and may be provided with sixteen corresponding sized holes 36a, each preferably ½″ in diameter and all positioned at the same radial distance from the center of the flange 36 as are the holes of flange 38 while being circumferentially spaced at equidistant arcuate lengths, 1″ apart from each other. It will be apparent from the foregoing that when the lock bolt 40 is disengaged from the flanges, the bent spindle 26 may be rotated together with its flange 38 to any desired angular position. The above-described differential arrangement of the holes in these flanges permits the locking of the upper end of the bent spindle at any one of a multiplicity of angular positions as close as ¼″ apart. Thus, this arrangement provides for very precise angular positioning of the cultivator disk gang assembly 10 about the vertical axis of the upper end of the bent spindle 26, thereby providing angular adjustment of the cultivator disk gang assembly relative to a vertical plane passing through the vertical axis of the bent spindle 26 and the direction of motion of the tractor.

While there have been shown and described the fundamental novel features of the invention as applied to the present embodiment, it will be understood that various omissions and substitutions and changes in the form and details of the device illustrated and in its operation may be made by those skilled in the art without departing from the spirit of the invention. It is the intention, therefore, to be limited only as indicated by the scope of the appended claims.

What is claimed is:

1. In combination with a horizontally disposed tool bar and a disk-type ground working implement supported by said tool bar, the improvement that comprises; a horizontally disposed U-shaped steel spring member having one leg of said U longer than the other leg, the shorter leg of said U-shaped spring being attached to said tool bar, a disk-type soil working implement having a bent spindle the upper end of which extends vertically and the rotation of this upper end determining the axis of disposition of the tool, a hollow tubular member secured to the longer leg of said U-shaped spring, said member having an index flange on one end thereof, a mating index flange secured to said spindle for cooperating with the flange on the end of said tubular member, and means for securing the flanges together to provide an indexing adjustment device for adjusting the position of the disk-type ground working implement relative to the movement of the agricultural vehicle.

2. In combination with a tool bar for supporting and pulling a disc-type ground working implement, improved mounting and adjusting means for said ground working implement comprising; a tubular housing attached to said ground working implement, a flange on the upper end of said tubular housing, a bent spindle, a pair of index flanges fixedly secured to said bent spindle, one of said flanges secured below the bend in said spindle and the other secured above the bend in said spindle, the lower flange adapted to cooperate with said flange on the upper end of said tubular housing for adjusting the angular position of the disc-type ground working implement relative to the axis of the lower portion of said bent spindle, a vertically extending housing attached to the tool bar, said housing being tubular and square in cross-section, a clamp including a pair of blocks, each of said blocks having a V-shaped groove formed within one face, means for clamping said blocks to said housing whereby said grooves receive said square housing and said housing is vertically adjustable within said blocks, means for mounting said clamp to said tool bar, a flange rigidly secured to the lower end of said vertically extending housing and adapted to cooperate with the index flange fixed to said spindle above the bend therein, the last recited flanges for adjusting the ground working implement relative to the axis of the lower portion of said bent spindle.

References Cited in the file of this patent

UNITED STATES PATENTS

| | | |
|---|---|---|
| 1,074,502 | Kanyo | Sept. 30, 1913 |
| 1,203,737 | Hoar | Nov. 7, 1916 |
| 1,254,618 | Moon et al. | Jan. 22, 1918 |
| 2,750,861 | Erwin | June 19, 1956 |
| 2,790,367 | Simmons | Apr. 30, 1957 |

FOREIGN PATENTS

| | | |
|---|---|---|
| 4,382 | Australia | Oct. 22, 1926 |
| 306,204 | Great Britain | Feb. 21, 1929 |